United States Patent [19]
Kajimoto et al.

[11] Patent Number: 5,574,364
[45] Date of Patent: Nov. 12, 1996

[54] POSITION DETECTOR INCLUDING A REFERENCE POSITION WHEREIN THE SENSOR IS SATURATING THE MR SENSOR FOR PREVENTING HYSTERESIS AND IN A BRIDGE CIRCUIT

[75] Inventors: Kazuo Kajimoto; Tomoatsu Makino; Yasuaki Makino, all of Okazaki; Seiki Aoyama, Toyohashi, all of Japan

[73] Assignee: Nippondenso Co., Ltd., Kariya, Japan

[21] Appl. No.: 199,337

[22] Filed: Feb. 18, 1994

[30] Foreign Application Priority Data

Feb. 19, 1993 [JP] Japan ................................. 5-030669

[51] Int. Cl.$^6$ .......................... G01R 33/025; G01B 7/14; G01B 7/30
[52] U.S. Cl. ................................ 324/207.12; 324/207.21; 338/32 R
[58] Field of Search .................... 324/207.12, 207.13, 324/207.14, 207.15, 207.20, 207.21, 207.22, 207.23, 207.24, 207.25, 174, 173, 166, 251, 252; 338/32 R, 32 H

[56] References Cited

U.S. PATENT DOCUMENTS

| | | |
|---|---|---|
| 3,949,345 | 4/1976 | Makino et al. . |
| 3,949,346 | 4/1976 | Makino et al. . |
| 4,369,405 | 1/1983 | Sato et al. ................... 324/174 |
| 4,401,944 | 8/1983 | Narimatsu et al. .............. 324/207.21 |
| 4,695,795 | 9/1987 | Nakamizo et al. .............. 324/174 |
| 4,746,862 | 5/1988 | Voki ................................ 324/174 |
| 4,866,381 | 9/1989 | Tatsuhiko . |
| 4,987,415 | 1/1991 | Santos et al. . |
| 5,270,695 | 12/1993 | Wheeler et al. .............. 324/207.12 X |
| 5,313,159 | 5/1994 | Allwine, Jr. .............. 324/174 |
| 5,351,004 | 9/1994 | Daniels et al. .............. 324/207.12 |

FOREIGN PATENT DOCUMENTS

| | | |
|---|---|---|
| 412017 | 2/1991 | European Pat. Off. . |
| 54-156656 | 12/1979 | Japan . |
| 55-51798 | 4/1980 | Japan . |
| 56-7013 | 1/1981 | Japan . |
| 56-33515 | 4/1981 | Japan . |
| 63-148117 | 6/1988 | Japan . |
| 63-148116 | 6/1988 | Japan . |
| 252966 | 11/1990 | Japan . |

*Primary Examiner*—Sandra L. O'Shea
*Assistant Examiner*—Roger Phillips
*Attorney, Agent, or Firm*—Cushman, Darby & Cushman

[57] ABSTRACT

A position detector which provides improved reference position detecting precision by stabilizing the output signal from magnetoelectric transducers in a reference position part. A rotor has a magnetized surface alternately provided with different magnetic poles and a reference positional part in which magnetic poles provided on the magnetized surface are partly omitted. A rotational angle sensor has MR elements laid out thereon in opposition to the magnetized surface of the rotor to output the voltage signal VS according to the magnetic field intensity in the magnetized surface due to the rotation of the rotor. A waveform processing circuit and a pulse signal processing signal shape the waveform of the voltage signal from the rotational angle sensor, and also generate the rotational angle pulse signal and a reference position pulse signal according to the waveform reforming signal. The reference positional part is arranged so that the magnetic field intensity therein can be within the saturation magnetic field region of the Mr elements.

25 Claims, 10 Drawing Sheets

POSITION DETECTOR INCLUDING A REFERENCE POSITION WHEREIN THE SENSOR IS SATURATING THE MR SENSOR FOR PREVENTING HYSTERESIS AND IN A BRIDGE CIRCUIT

This application claims the benefit of the prior patent application No. 5-30669 filed in Japan on Feb. 19, 1993 the content of which is incorporated hereinto by reference.

BACKGROUND OF THE INVENTION

1. Field of the Invention

The present invention generally relates to a moving position detector. More particularly, the present invention relates to a rotational position detector which utilizes magnetoelectric transducers having particular saturation characteristics as to voltage output, such as magnetoelectric transducer elements composed of a ferromagnetic material, e.g., Ni-Co type alloy and Ni-Fe type alloy (hereinafter referred to as "MR elements"), and nonlinear type Hall elements.

2. Description of Related Art

A rotational position detector in which the outer periphery of a rotor has a magnetized surface alternately provided with different magnetic poles and the magnetized surface is detected by using a rotational angle sensor utilizing magnetoelectric transducers has been proposed as disclosed, for example, in Japanese Unexamined Patent Publication No. 54-156656, Japanese Unexamined Utility Model Publication No. 56-12815 or Japanese Examined Patent Publication No. 2-52966.

The rotational angle sensor of the above rotational position detector comprises a single or a plurality of magnetoelectric transducers to obtain the output voltage from the rotational angle sensor by means of the magnetoelectric transducing action according to the magnetic field intensity. On the other hand, the magnetized surface of the rotor is alternately provided with different magnetic poles and a reference position part magnetized with a larger magnetization pitch is formed in part of the magnetized surface so that the rotational angle sensor generates rotational angle signals and reference position signals. Furthermore, the waveform of the output signal from the rotational angle sensor is shaped, and the rotational angle signal is generated according to the reference position signal. During this process, the output voltage from the magnetoelectric transducer becomes constant (e.g., at "0" value) in the reference position part for the specified duration, and consequently the reference position signal can be obtained.

However, in the rotational position detector in the above arrangement, when the magnetization pitch of magnetic poles is widened as shown in (A) of. FIG. 17, the magnetic field intensity in the reference position part lowers at the central part thereof as shown in (B) of FIG. 17. As a result, a swell or fluctuating noise as shown in (C) of FIG. 17 is present on the output voltage signal from the rotational angle sensor in the reference position part according to the variation in the magnetic field intensity.

In addition to the above problem, when ferromagnetic MR elements composed of a ferromagnetic material, such as a Ni-Co type alloy, are used as magnetoelectric transducers, there are the adverse effects of the hysteresis characteristics as to the output voltage Vm in the range A of magnetic field intensity Hy as shown in FIG. 16. Moreover, the hysteresis characteristics themselves vary according to the material manufacturing conditions, i.e, the hysteresis characteristics differ from product to product. This makes the output waveform in the reference position part more unstable.

For these reasons, the reference position detecting precision is lowered. Therefore, when the conventional rotational position detector is used in an operational environment or rotation which is subject to a large variation or to high, precision high-volume pulses, such as rotational position detectors for automobile engines, these problems may severely restrict the design of rotational angle sensors.

SUMMARY OF THE INVENTION

It is therefore an object of the present invention to solve the above problems by providing a position detector which provides the improved reference position detecting precision by stabilizing the output signal from magnetoelectric transducers in the reference positional part.

In order to achieve the above object, the first embodiment of the present invention comprises a rotor, the outer periphery of which includes a magnetized surface alternately provided with different magnetic poles and at least one reference positional part magnetized at a larger magnetization pitch than that of the other magnetized parts, and magnetoelectric transducers outputting the voltage signal according to the magnetic field intensity of the magnetized surface due to the rotation of the rotor and having output saturation characteristics for the magnetic field intensity higher than the specified level, and characterized by having the magnetic field intensity in the reference positional part of the rotor set within the output saturation magnetic field region of the magnetoelectric transducers.

Also in order to achieve the above object, the second embodiment comprises a rotor, the outer periphery of which includes a magnetized surface alternately provided with different magnetic poles and at least one reference positional part magnetized at a larger magnetization pitch than that of the other magnetized parts, and magnetoelectric transducers outputting the voltage signal according to the magnetic field intensity of the magnetized surface due to the rotation of the rotor and having output saturation characteristics for the magnetic field intensity higher than the specified level, and characterized by having the magnetoelectric transducers composed of a ferromagnetic reluctance elements and the magnetic field intensity in the reference positional part of the rotor set higher than the reversible magnetic field region at which the hysteresis of the magnetoelectric reluctance elements does not occur.

Furthermore, in the first or second embodiment of the present invention, the magnetism of a pair of magnetic poles provided in opposition to each other in the reference positional part of the rotor may be set stronger than that of the other magnetic poles.

Moreover, in the first or second embodiment of the present invention, the magnetization width of a pair of magnetic poles provided in opposition to each other in the reference positional part of the rotor may be set wider than that of the other magnetic poles.

In accordance with the first embodiment of the invention, the magnetoelectric transducers output the voltage signal according to the magnetic field intensity of the magnetized surface of the rotor. At this time, as the magnetic field intensity in the reference positional part of the rotor is within the magnetic field region in which the output voltage from the magnetoelectric transducers saturates, the voltage signal can minimize the adverse effects of the magnetic field decrease in the reference position part. As a result, the output voltage from the magnetoelectric transducers corresponding to the reference positional part can be held at a constant level and the generation of swell or fluctuating noise can be controlled.

In accordance with the second embodiment of the invention, the ferromagnetic reluctance elements as magnetoelectric transducers output the voltage signal according to the magnetic field intensity of the magnetized surface of the rotor. At this time, as the magnetic field intensity in the reference position part is within the reversible magnetic field region of the ferromagnetic reluctance elements, the output from the ferromagnetic reluctance elements in the reference position part can prevent the adverse effects of the hysteresis. As a result, the reference position detecting precision can be improved.

DETAILED DESCRIPTION OF THE PREFERRED EMBODIMENTS

FIRST EMBODIMENT

This invention may best be understood with reference to the following description of the presently preferred first embodiment implemented as in a rotational position detector for use in a four-cycle four-cylinder engine together with the accompanying drawings.

Figure 1:
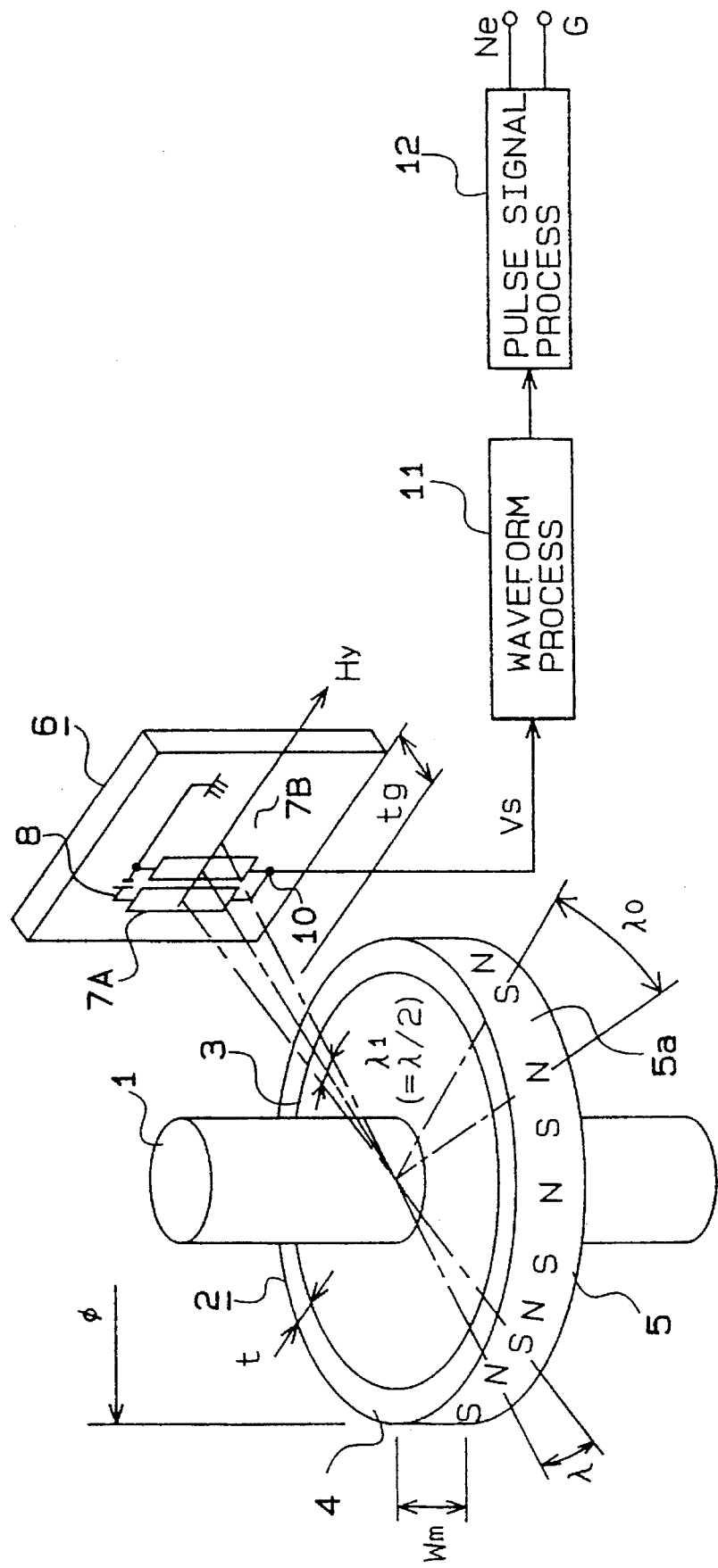
FIG. 1 is a schematic view showing a rotational position detector according to the first embodiment of the present invention.

As illustrated in FIG. 1, a disk-shaped rotor 2 is fixedly installed on a shaft 1 rotating at the ratio of ½ rotation to one rotation of the engine. The rotor 2 comprises a magnet holding part 3 composed of a non-magnetic material (e.g., austenitic stainless steel) and an annular isotropically sintered ferrite magnet 4 (hereinafter referred to as "magnet") adhered to the outer periphery of the magnet holding part 3. In this embodiment, the residual magnetic flux density Br of the magnet 4 is set to 2000 to 2500G. As the specific dimensional values of the magnet 4 of this embodiment, the diameter $\emptyset$ is 80mm, the thickness Wm in the axial direction is 8mm and the thickness t in the radial direction is 4mm.

The outer periphery of the magnet 4 constitutes a magnetized surface 5 alternately provided with magnetic poles (N and S poles) at regular intervals (i.e., magnetization pitch $\lambda$). The magnetized surface 5 includes a reference position part 5a with the wider magnetization pitch $\lambda 0$ in four positions at every 90°, each corresponding to a respective cylinder of a four-cylinder engine (not shown). The relation between the magnetization pitch $\lambda 0$ of the reference position part 5a and the magnetization pitch $\lambda$ of the other magnetic poles is set so that $\lambda 0 = 3 \cdot \lambda$, and in this embodiment, the magnetization pitch $\lambda$ is set to 5°.

Figure 2:
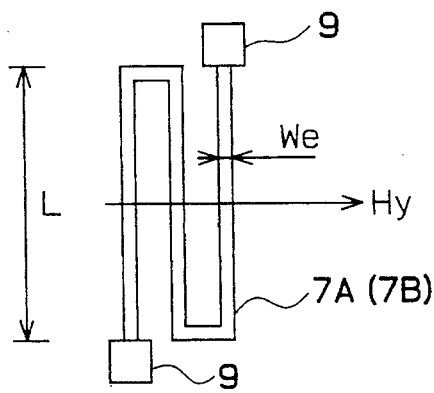
FIG. 2 is a front view illustrating the shape of an MR element according to the first embodiment.

A rotational angle sensor 6 has a pair of MR elements 7A and 7B as magnetoelectric transducers, which are laid out thereon in opposition to the magnetized surface 5 of the rotor 2. The distance tg between the MR elements 7A and 7B and the magnetized surface 5 should be determined taking the vibration of an applied car, the dimensional tolerances of applied parts and components, the assembly tolerance thereof, etc. into account, and in this embodiment, the distance tg is set to 1.5 mm. The MR elements 7A and 7B are composed of a ferromagnetic material, such as Ni-Cd type alloy. The installation pitch $\lambda 1$ of the MR elements 7A and 7B is approximately ½ of the magnetization pitch $\lambda$ (i.e., $\lambda 1$ is equal to $\lambda/2$). A power source (with the power voltage of 5 V) 8 is serially connected to the MR elements 7A and 7B. FIG. 2 illustrates the shape pattern of the MR element 7A or B. In this embodiment, the MR element 7A or 7B is doubly folded, and a terminal 9 is connected to each end thereof. As the specific dimensional values of this pattern, the length L is 3 mm and the width We is 30 μm.

Furthermore, a waveform processing circuit 11 is connected to an intermediate point 10 between the MR elements 7A and 7B. The MR elements 7A and 7B vary the electric resistance values thereof according to a magnetic field intensity Hy in the circumferential direction with a delay due to the rotation of the rotor 2 by the installation pitch $\lambda 1$ (which is equal to $\lambda/2$). As a result, a voltage of the intermediate point 10 between the MR elements 7A and 7B varies, and a voltage signal Vs is outputted from the rotational angle sensor 6 to the waveform processing circuit 11. The waveform processing circuit 11 shapes the waveform of the voltage signal Vs from the rotational angle sensor 6. A pulse signal processing circuit 12 is connected to the waveform processing circuit 11 to generate a rotational angle pulse signal Ne and the reference position part pulse signal G according to the waveform shaped signal.

Figure 3:
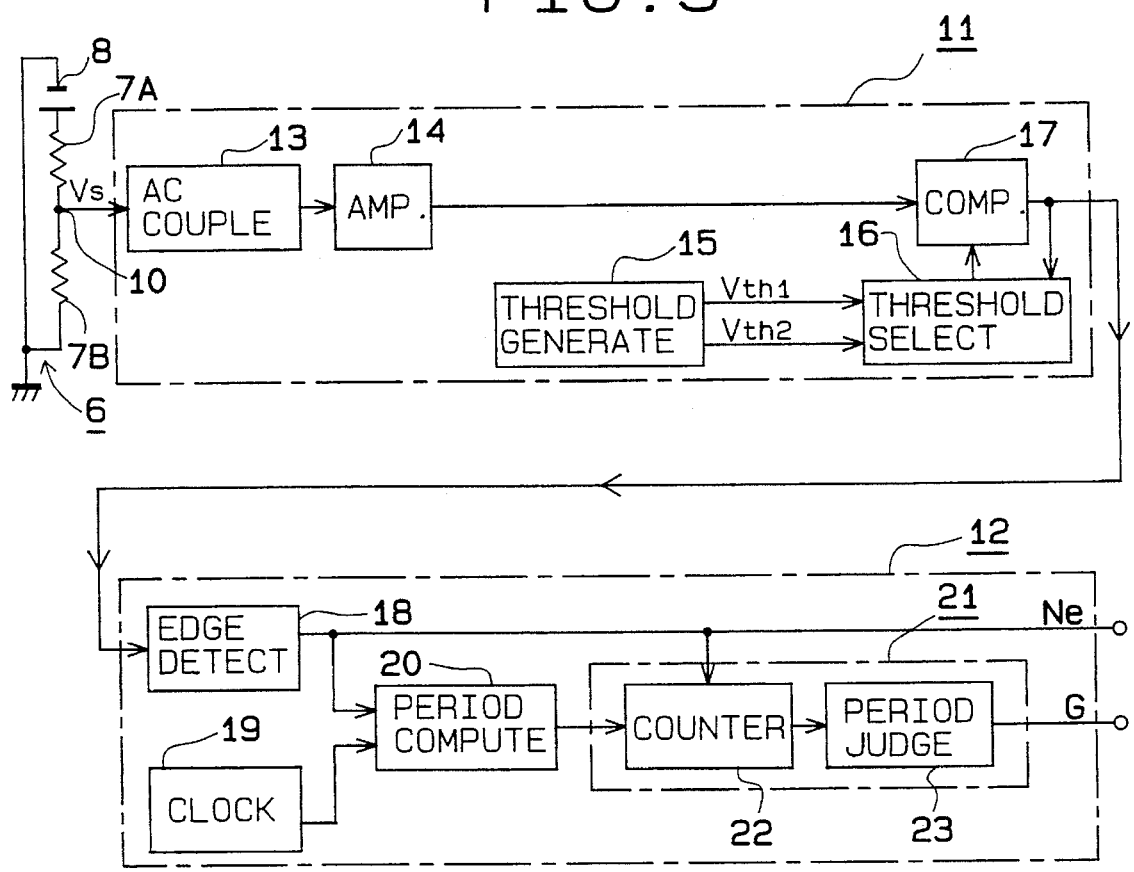
FIG. 3 is an electric block diagram illustrating the configuration of a waveform processing circuit and a pulse signal processing circuit according to the first embodiment.

FIG. 3 is a block diagram illustrating the configuration of the waveform processing circuit 11 and pulse signal processing circuit 12. As shown in this figure, an AC coupling 13 of the waveform processing circuit 11 is connected to the output terminal of the rotational angle sensor 6. The AC coupling 13 removes only the DC component from the voltage signal Vs outputted from the rotational angle sensor 6 and extracts only the AC component therefrom. To the AC coupling is connected an amplifier 14.

To the output side of the amplifier 14 is connected the input side of a comparator 17. With the comparator 17 are connected the output side of a threshold level generating circuit 15 through a threshold level selecting circuit 16. The threshold level generating circuit 15 outputs the first threshold level Vth1 and the second threshold level Vth2, while the threshold level selecting circuit 16 selectively outputs either the first threshold level Vth1 or the second threshold level Vth2 according to the output of the comparator 17. The comparator 17 generates a square wave according to the output signal from the amplifier 14 and the first threshold level Vth1 or the second threshold level Vth2 from the threshold level selecting circuit 16. Incidentally, the threshold level generating circuit 15 sets the values of the first threshold level Vth1 and second threshold level Vth2 so that the duty ratio of the waveform of the output signal from the comparator 17 can be 50%.

On the other hand, a rise and fall edge detecting circuit (hereinafter referred to as "edge detecting circuit") 18 for the pulse signal processing circuit 12 is connected to the comparator 17. The edge detecting circuit 18 detects the rise and fall edges of the square wave signal outputted from the comparator 17 and then outputs the pulse signal in correspondence to each edge. In this way, the edge detecting circuit 18 outputs the rotational angle pulse signal Ne.

The edge detecting circuit 18 and a clock generating circuit 19 are connected to the input side of a period computing circuit 20. The period computing circuit 20 computes the period of the rotational angle pulse signal Ne outputted from the edge detecting circuit 18 according to the number of clocks from the clock generating circuit 19.

To the period operating circuit 20 is connected a reference signal generating circuit 21 comprising a counter part 22 and a period judging part 23. It is so arranged that the output signal from the period computing circuit 20 is inputted into, the clock terminal of the counter part 22, while the output signal (or the rotational angle pulse signal Ne) from the edge detecting circuit 18 is inputted into the reset terminal of the counter part 22. The counter part 22 performs count-up and count-down operations according to the clock and reset signals.

Also to the counter part is connected the period judging part 23 operating a period ratio of Tn/Tn-1 according to the output period T of the rotational angle pulse signal Ne, where the subscript "n" is the current value and the subscript "n-1" is the previous value. The period judging part 23 outputs the reference position part pulse signal G according to a period ratio of Tn/Tn-1.

Figure 5:
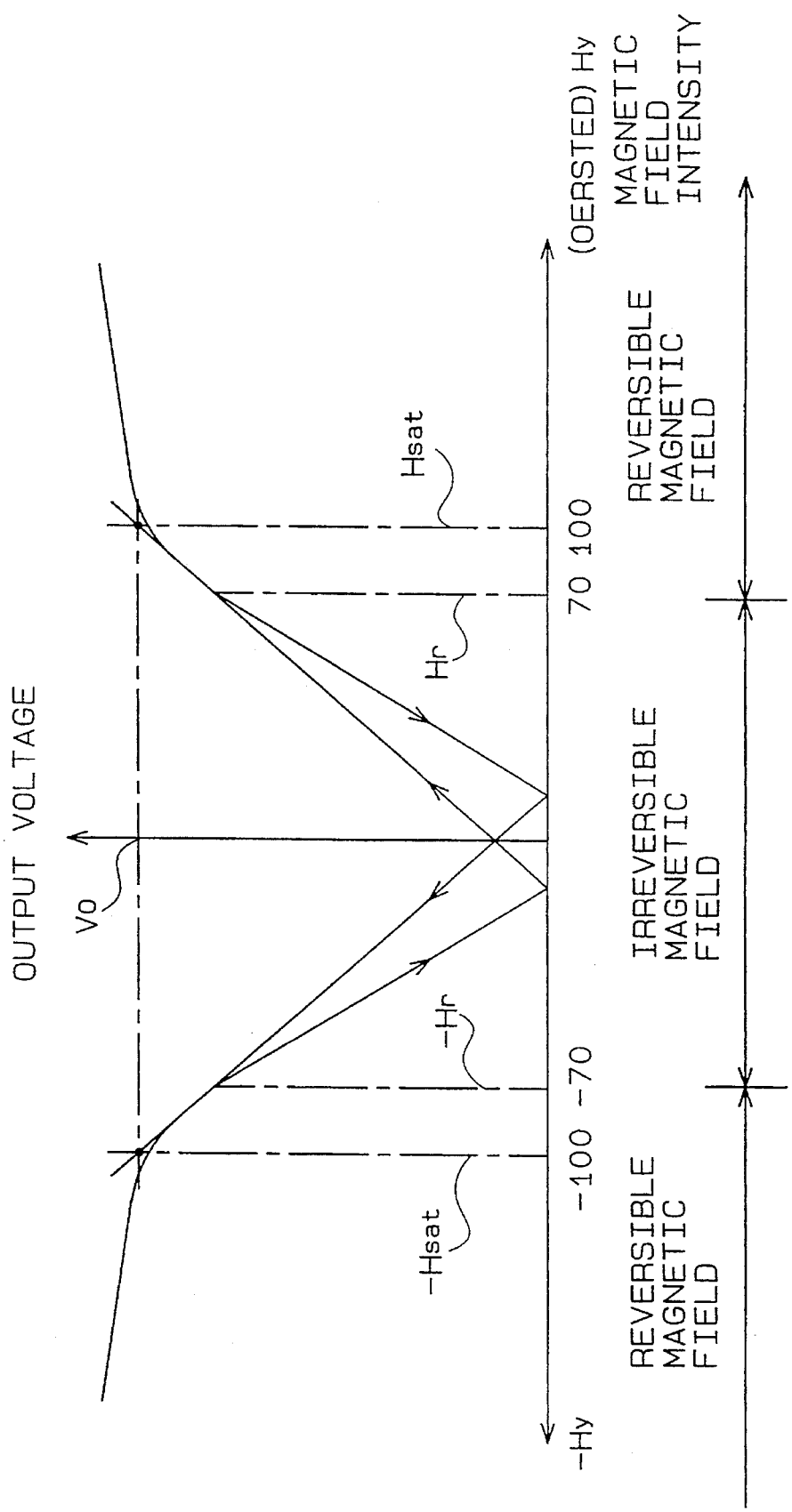
FIG. 5 is a characteristic diagram illustrating the relation between the magnetic field intensity and output voltage from the MR element according to the first embodiment.

Now, the variation in the resistance value of the MR elements 7A and 7B in correspondence to the magnetic field intensity Hy will be described. FIG. 5 is a Hy-Hv characteristic diagram illustrating the variation in the resistance value of the MR elements 7A and 7B by using the output voltage Vm.

In the characteristic diagram illustrated in Fig. 5, the output voltage Vm from the MR elements 7A and 7B have hysteresis characteristics within the region between reversible magnetic field intensities Hr and -Hr which are the hysteresis generation limits. In the regions outside the hysteresis region between -Hr and Hr exist saturated magnetic field intensities Hsat and -Hsat outside which saturate the output voltage Vm from the MR elements 7A and 7B at a saturation voltage V0.

In this embodiment specifically arranged as described in the above, the saturated magnetic field intensity Hsat of the MR elements 7A and 7B is set to approximately 100Oe and the reversible magnetic field intensity Hr thereof is set to approximately 70Oe. On the other hand, the magnetic field intensity Hy in the reference position part 5a of the magnetized surface 5 is set so as to be maintained within the saturated magnetic field region (Hy is larger or equal to 100 or Hy is smaller or equal to -100). Therefore, the output voltage Vm from the MR elements 7A and 7B can be maintained at the saturation voltage V0 or more in the reference position part 5a.

Next, the operation of the rotational position detector according to the first embodiment of the present invention will be described.

Figure 4:
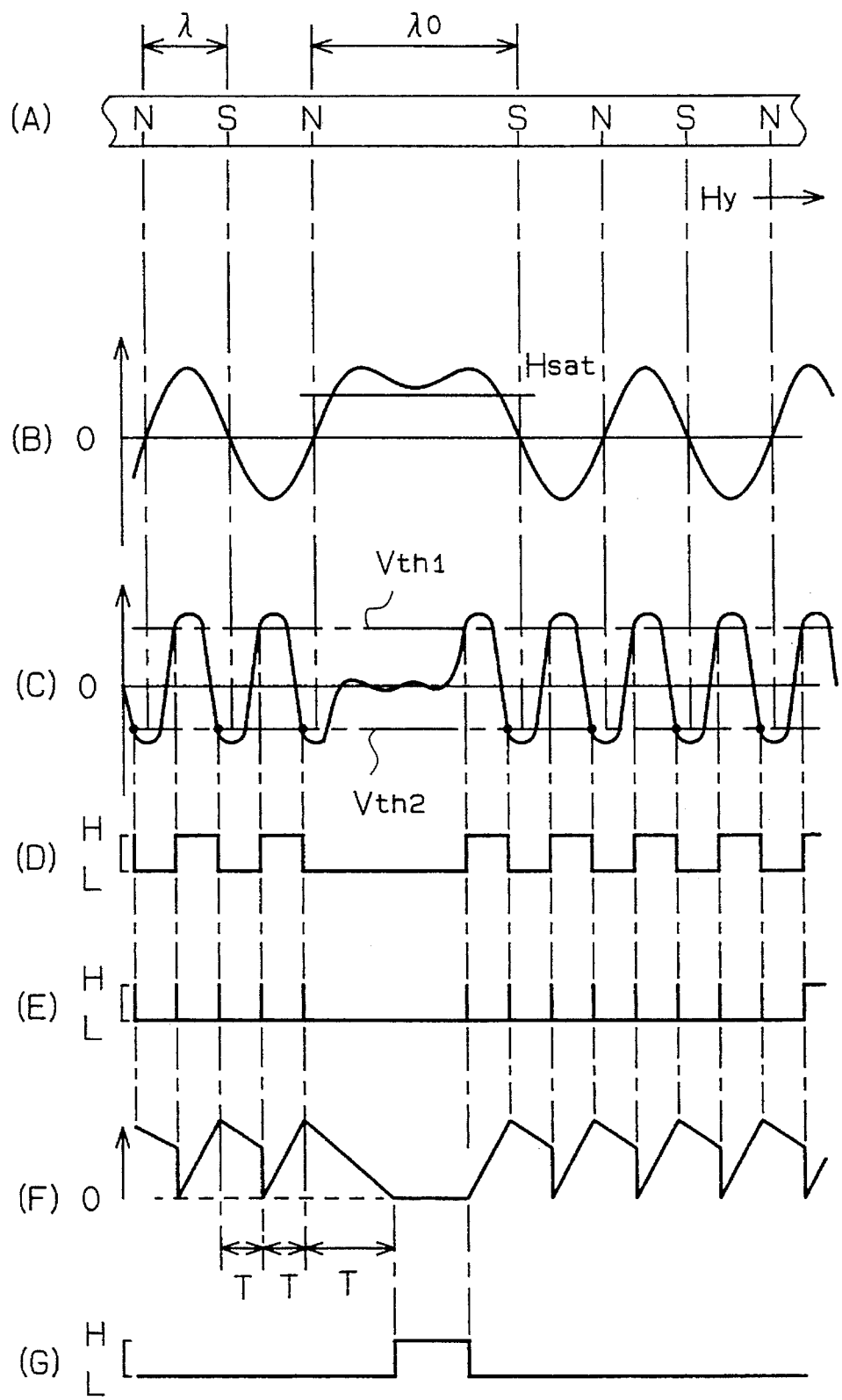
FIG. 4 is a time chart illustrating magnetization pattern (A), magnetic field intensity (B), and waveforms (C) through (G) of the rotational position detector according to the first embodiment.

FIG. 4 is a time chart illustrating the magnetic field intensity Hy of the magnetized surface 5 and the operation of the rotational position detector in correspondence thereto. As shown in this chart, the magnetic field intensity Hy in the circumferential direction shown in (B) of FIG. 4 varies according to the magnetized pattern of the magnetized surface 5 shown in (A) of FIG. 4. The rotational angle sensor 6 outputs the voltage signal Vs, as shown in (C) of FIG. 4, at the ratio of 2 cycles to one cycle of variation in the magnetic field intensity Hy due to the rotation of the rotor 2.

As aforementioned, as Hy is larger than or equal to Hsat in the reference position part 5a of the magnetized surface 5, both the MR elements 7A and 7B operate within the saturated magnetic region. Accordingly the voltage signal Vs from the rotational angle sensor 6, which is the intermediate point voltage from the MR elements 7A and 7B, can substantially reduce the swell or fluctuating noise of the output voltage caused by the reduction the magnetic field intensity at the central part of the reference position part 5a. Therefore, the voltage signal Vs can be maintained at a swell noise level of approximately "0" value in the reference position part 5a.

In the waveform processing circuit 11 illustrated in FIG. 3, the comparator 17 generates as shown in (D) of FIG. 4 signal waveform with a duty ratio of 50% according to the voltage signal Vs, which is inputted from the rotational angle sensor 6 through the AC coupling 13 and the amplifier 14, and first threshold level Vth1 or the second threshold level Vth2, which is set by the threshold level selecting circuit 16. That is, the comparator 17 outputs the H (high) level signal within the shifting range from the first threshold level Vth1 to the second threshold level Vth2, and then outputs the L (low) level signal within the shifting range from the second threshold level Vth2 to the first threshold level Vth1. As the voltage signal Vs from the rotational sensor 6 is maintained at approximately "0" value in the reference position part 5a, the output signal of the comparator 17 is also maintained at the L level. As a result, the output signal of the waveform processing circuit 11 is a square wave with a duty ratio of 50% in any part other than the reference position part 5a, and the waveform thereof has an omission only at the part which is in correspondence to the reference position part 5a.

In the pulse signal processing circuit 12, the edge detecting circuit 18 generates as shown in (E) of FIG. 4 the rotational angle pulse signal Ne for each specified rotation angle by using the rise and fall edges of the output signal from the waveform processing circuit 11. The rotational angle pulse signal Ne outputted from the edge detecting circuit 18 has a signal waveform with an omission only in the part corresponding to the reference position part 5a like the above output waveform from the waveform processing circuit 11.

The counter part 22 of the reference signal generating circuit 21 performs the count-up and count-down operations according to the number of clocks from the period computing circuit 20. To be specific, as shown in (F) of FIG. 4, the counter part 22 switches to the count-down operation when the reset signal (the output signal from the edge detecting circuit 18) is inputted thereinto during the count-up operation, and resumes the count-up operation after once resetting the output signal when the reset signal is inputted thereinto during the count-down operation. In the reference position part 5a, however, as the rotational pulse signal Ne is omitted, the reset signal is not inputted into the counter part 22 during the count-down operation. As a result, the counter part 22 continues the count-down operation until the count value becomes "0."

The period judging part 23 judges whether a period ratio of Tn/Tn-1 during the continuous count-up and count-down operations is at the specified preset value m or larger (m is 3 in this embodiment) or not. As shown in (G) of FIG. 4, when Tn/Tn-1 is smaller than 3, the period judging part 23 maintains the output signal level at the L level, and when Tn/Tn-1 is larger than/equal to 3, it maintains the output signal level at the H level. That is, as the rotational angle pulse signal Ne is outputted for each specified angle in any part other than the reference position part 5a, Tn is equal to Tn-1 and the output signal level of the period judging part 23 is maintained at the L level. In the reference position part 5a, however, as the rotational pulse signal Ne is omitted, Tn/Tn-1 is larger than/equal to 3 and the output signal level of the period judging part 23 is maintained at the H level.

Then, when the reset signal is outputted again from the edge detecting circuit 18 to the counter part 22, the counter part 22 resumes the count up operation. As Tn/Tn-1 becomes smaller than 3 again, the period judging part 23 reduces the output signal level to the L level.

In this way, as the rotor 2 rotates, the rotational angle pulse signal Ne is outputted for each specified angle from the rotational angle sensor 6, and one reference position part pulse signal G at the H level is outputted in correspondence to the reference position part 5a.

As described in detail in the above, the rotational position detector according to this embodiment is. arranged so that the rotational angle sensor 6 is composed of the MR elements (ferromagnetic reluctance elements) 7A and 7B. The MR elements 7A and 7B are laid out in opposition to the magnetized surface 5 of the rotor 2, which is alternately provided with different magnetic poles. The magnetized surface 5 of the rotor 2 includes the reference position part 5a provided with magnetic poles at a wider magnetization pitch, and the magnetic field intensity Hy in the reference position part 5a is within the saturated magnetic field region of the MR elements 7A and 7B.

In this arrangement, the output voltage Vm corresponding to the resistance value from the MR elements 7A and 7B in correspondence to the reference position part 5a is not affected by the hysteresis, and moreover, even if there is a swell in the magnetic field intensity Hy, it is maintained at an almost constant saturation value. Accordingly, the voltage signal Vs from the rotational angle sensor 6 is maintained at an almost constant value. As a result, the swell noise of the rotational angle sensor 6 can be controlled, the precision of detecting the reference position part 5a can be improved, and the S/N ratio can be set always to a high value.

In the above embodiment, the magnetic field intensity Hy in the reference position part 5a of the rotor 2 is set to be higher than the saturated magnetic field intensity Hsat. The magnetic field intensity Hy, however, can be set to the intensity in the magnetic field region between the reversible magnetic field intensity Hr and the saturated magnetic field intensity Hsat (within 70 to 100Oe). In this case, as the output voltage (resistance value) from the MR elements 7A and 7B in the reference position part 5a varies without being affected by the hysteresis, the output voltage from the rotational angle sensor 6 in the reference position part 5a can be constantly obtained. As a result, the same advantages of the invention can be obtained as those of the above embodiment.

Furthermore, the specific values are set in the above embodiment to obtain the desired saturated magnetic field intensity Hsat and reversible magnetic field intensity Hr. These value, however, should not be set only to the above specific values but may be arbitrarily set to any value according to the operational condition and required precision.

Moreover, although the rotational angle sensor 6 comprises a pair of half bridges in the previous embodiment, it can use a full bridge instead. It is also possible that a more than one pair of sensors are laid out on a single board at regular intervals to double or triple the number of pulses.

Second Embodiment

The second embodiment of the present invention will now be described referring only to the differences from the first embodiment.

Figure 6:
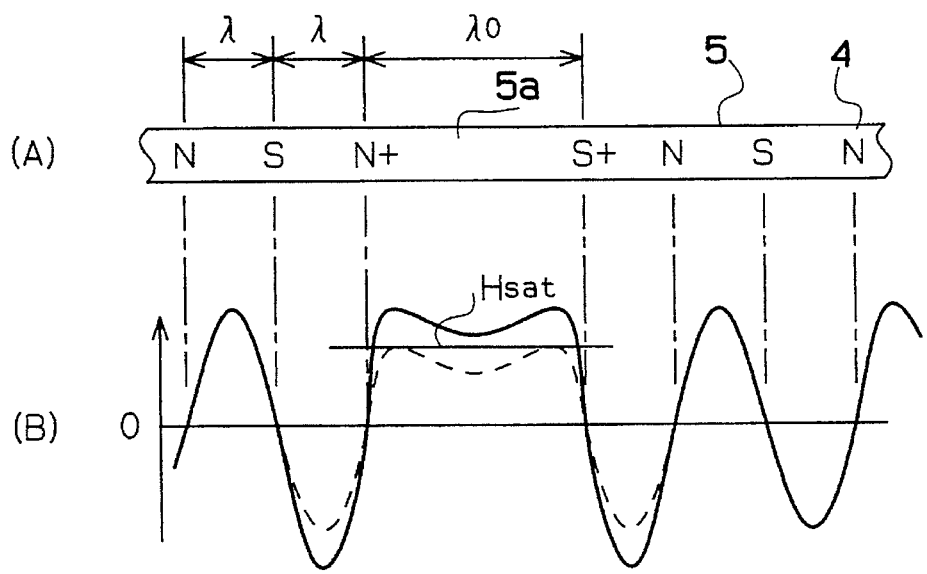
FIG. 6 is a waveform chart illustrating the magnetization pattern (A) of the magnetized surface and the magnetic field intensity (B) according to the second embodiment.

FIG. 6 illustrates in (A) and (B) the magnetized pattern of the magnetized surface 5 and the magnetic field intensity Hy corresponding to the magnetized pattern according to the second embodiment, respectively. As shown in this figure, the magnetized surface 5 is alternately provided with different magnetic poles at the magnetization pitch $\lambda 0$ on one hand, and the magnetized surface 5 included the reference position part 5a provided with magnetic poles at the magnetization pitch $\lambda 0$ ($\lambda 0 = n \cdot \lambda$, where n =2 to 4) on the other hand. Furthermore, the both sides of the reference position part 5a are provided with the magnetic poles with higher intensity than that of the other magnetic poles as shown by N+ and S+ in (A) of FIG. 6.

In this arrangement, the magnetic field intensity Hy in the reference position part 5a is higher, as shown by a solid line in (B) of FIG. 6 compared with a case where magnetic poles with a normal level of magnetism are provided as shown by a broken line in (B) of FIG. 6. As a result, the magnetic field intensity Hy in the reference position part 5a is maintained within the saturated magnetic field region. As the MR elements 7A and 7B operate within the saturated magnetic field region accordingly, the swell noise of the output voltage VS from the rotational angle sensor 6 in the reference position part 5a can be stabilized at a level of approximately "0" value.

In the second embodiment, as understood in the above description, the MR elements 7A and 7B are arranged for operation within the saturated magnetic field region by strengthening the magnetism of the magnetic poles in the reference position part 5a. As a result, also in the second embodiment, the adverse effects of the hysteresis on the output voltage (or resistance value) from the MR elements 7A and 7B can be prevented, and the same effects and advantages as those of the first embodiment can be obtained.

Third embodiment

Next, the third embodiment of the present invention will be described.

Figure 7:
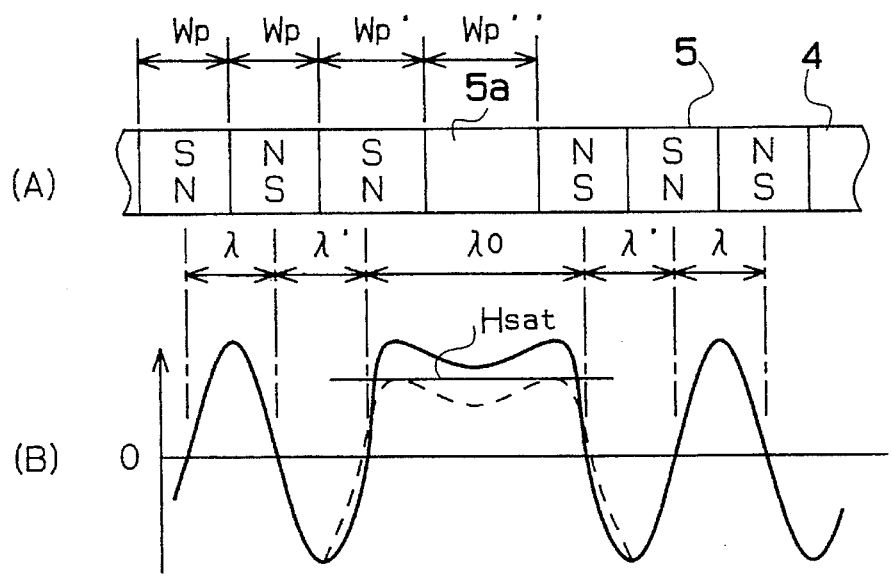
FIG. 7 is a waveform chart illustrating the magnetization pattern (A) of the magnetized surface and the magnetic field intensity (B) according to the third embodiment.

FIG. 7 illustrates in (A) and (B) the magnetized pattern of the magnetized surface 5 and the magnetic field intensity Hy corresponding to the magnetized pattern according to the third embodiment, respectively. The rotational position detector according to the third embodiment is different from the first and second embodiments in that a radial anisotropic ferrite type plastic magnet is used. As shown in (A) of FIG. 7, the magnetized surface 5 of the magnet 4 is alternately provided with magnetic poles with different directions in such a way that the S and N poles are laid out in opposition to each other both in the vertical and circumferential directions. On the other hand, part of the magnetized surface 5 includes the reference position part 5a which a non-magnetized part (where a weakly magnetized part can also be used) with the magnetization width Wp". The magnetic poles of the magnetized surface 5 are provided with the magnetization width Wp, while only the magnetic poles in opposition to each other in the reference position part 5a are provide with the magnetization width Wp' where Wp' is larger than Wp. In this embodiment, the magnetization widths are set to be Wp'=n×Wp and Wp"=m×Wp", where n=1.1 to 1.5 and m=1 to 3, and the magnetization pitches are $\lambda$, $\lambda$" and $\lambda 0$(where, $\lambda<\lambda"<\lambda 0$) corresponding to Wp, Wp' and Wp" respectively.

In this arrangement, the magnetic field intensity Hy in the reference position part 5a shown by a solid line in (B) of FIG. 7 is higher compared with a case where the magnetic poles are provided with the same magnetization width shown by a broken line in (B) of FIG. 7. As a result, the magnetic field intensity Hy in the reference position part 5a is maintained within the saturated magnetic field region, and consequently the output voltage Vm from the MR elements 7A and 7B is maintained at the saturation voltage V0. Accordingly the output voltage from the rotational angle sensor 6 can be stabilized at a"0" value without fail.

As aforementioned, the third embodiment can have the same effects and advantages as those of the first embodiment by maintaining the magnetic field intensity Hy in the reference position part 5a within the saturated magnetic field region.

The first, second and third embodiments according to the present invention are described in the above in a case where ferromagnetic MR elements utilizing the circumferential element of the magnet as a magnetic signal is used. Instead of the ferromagnetic MR elements, however, Hall elements or any other magnetoelectric transducers having the saturation characteristics of the signal output can be used. The same effects can also be obtained by composing the sensor with the radial element of the magnet as a signal element.

The magnet may be embodied in other forms as described below to obtain the magnetic field intensity Hy, which is higher than the saturated magnetic field intensity Hsat, in the reference position part 5a.

FIGS. 8 to 11 illustrate magnets in the fourth to seventh embodiments of the present invention, which are magnetized in accordance with the second embodiment.

Fourth Embodiment

Figure 8:
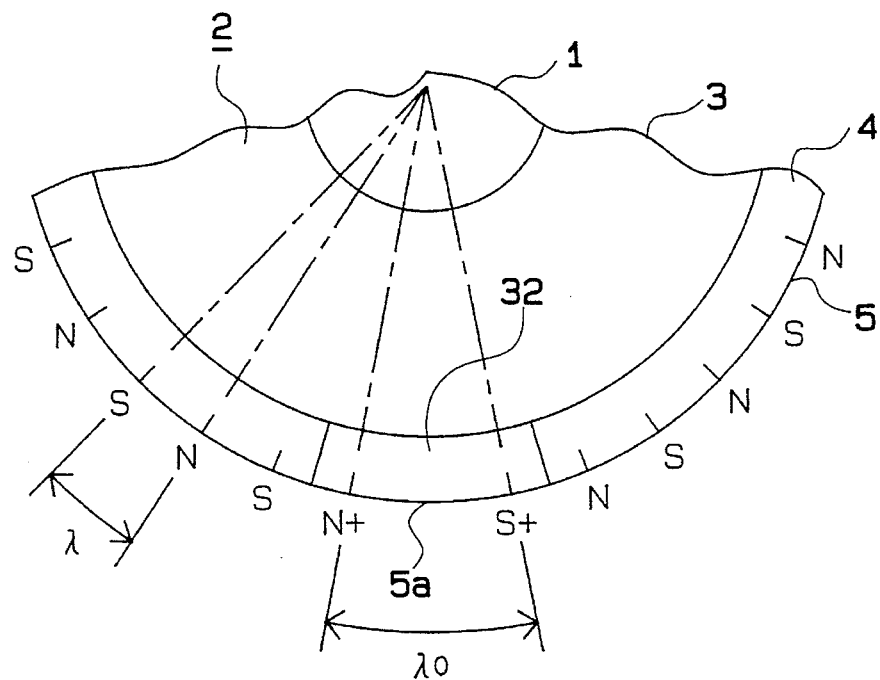
FIG. 8 is a partial plan view illustrating a magnet according to the fourth embodiment.

As illustrated in FIG. 8, an annular isotropic ferrite type magnet 4 with a residual magnetic flux density Br of 1000 to 4000G 4 is adhered to the outer periphery of the magnet holding part 3. The magnetized surface 5 of the magnet 4 is alternately provided with magnetic poles at the magnetization pitch $\lambda$. The magnet 4 includes the reference position part 5a alternately provided with magnetic poles with the magnetization pitch $\lambda 0(\lambda 0 = n\cdot\lambda$, where n =2 to 4). The magnetism of the magnetic poles at the ends of the reference position part 5a is made stronger than that of any other magnetic poles by fitting a rare-earth type magnet with the residual magnetic flux density Br of 5000 to 12000G into the reference position part 5a as shown by N+ and S+ in FIG. 8.

Fifth Embodiment

Figure 9:
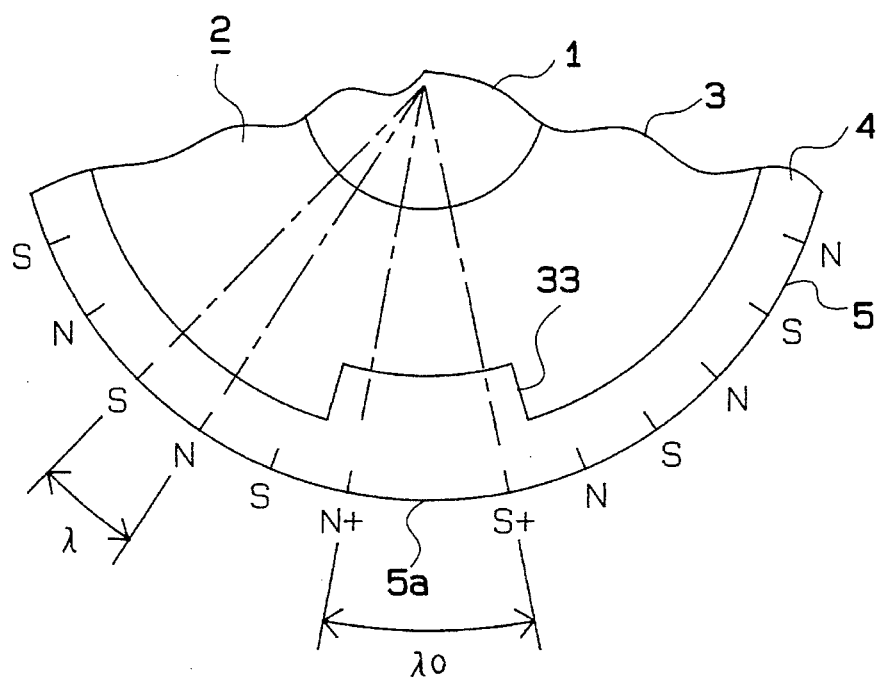
FIG. 9 is a partial plan view illustrating a magnet according to the fifth embodiment.

As illustrated in FIG. 9, an inwardly and radially recessed part 33 is formed and magnetized at the magnetization pitch $\lambda 0(\lambda = n\cdot\lambda$, where n=2 to 4) in part of the outer periphery of the magnet holding part 3, and an annular isotropic ferrite type magnet 4 is adhered to the outer periphery of the magnet holding part 3. The reference position part 5a is provided in correspondence to the recessed part 33. In the reference position part 5a, the magnet 4 is made thicker in the radial direction than the other portions thereof to increase the permeance coefficient of the magnet 4 and strengthen the magnetism of the magnetic poles at the ends of the reference position part 5a as shown by N+ and S+ in FIG. 9.

Sixth Embodiment

Figure 10:
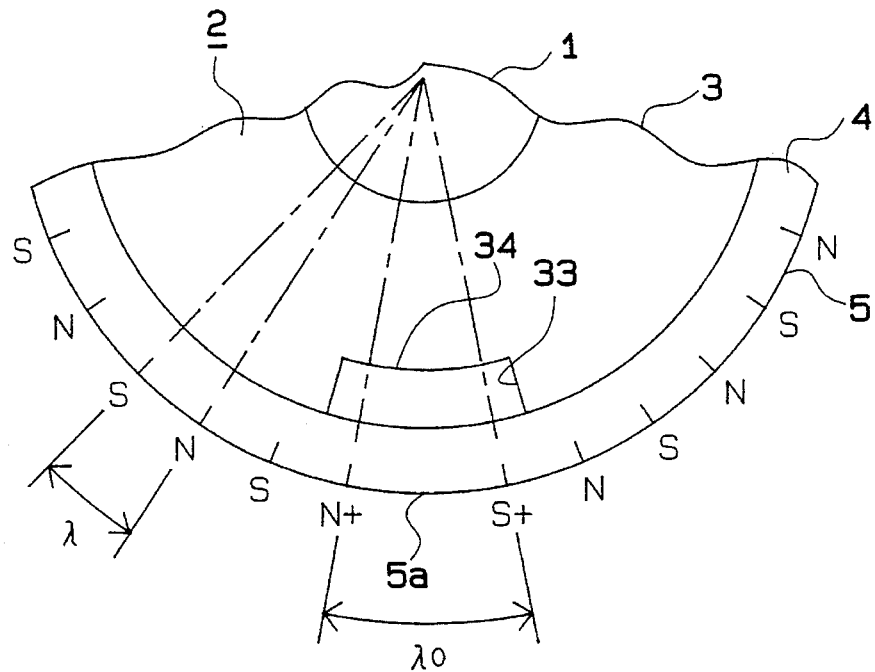
FIG. 10 is a partial plan view illustrating a magnet according to the sixth embodiment.

As illustrated in FIG. 10, the recessed part 33 is formed and magnetized with the magnetization pitch $\lambda 0(\lambda 0=n\cdot\lambda$, where n=2 to 4) in part of the outer periphery of the magnet holding part 3, and a back yoke 34 composed of a magnetic material is adhered to the recessed part 33. An annular isotropic ferrite type magnet 4 is adhered to the outer periphery of the magnet holding part 3, and the reference position part 5a is provided in correspondence to the back yoke 34. In this arrangement, the magnetism of the magnetic poles at the ends of the reference position part 5a can be made stronger than that of any other magnetic poles as shown by N+ and S+ in FIG. 10.

Seventh Embodiment

Figure 11:
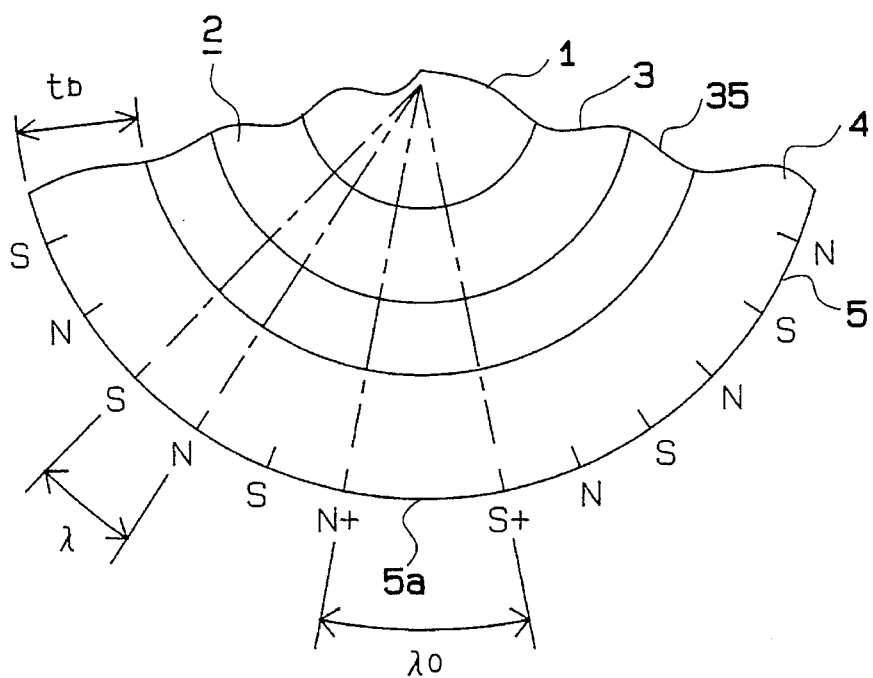
FIG. 11 is a partial plan view illustrating a magnet according to the seventh embodiment.

As illustrated in FIG. 11, an annular back yoke composed of a magnetic material is adhered to the outer periphery of the magnet holding part 3, and an annular isotropic ferrite type magnet 4 is adhered to the outer periphery of the back yoke 35. The width th of the back yoke 35 in the radial direction is made wider than "$\lambda/2$." The magnetized surface 5 includes the reference position part 5a magnetized at the magnetization pitch $\lambda 0(\lambda 0=n\cdot\lambda$, where n=2 to 4). The back yoke 35 is arranged so that the effects thereof can be given only to the ends of the reference position part 5a, the magnetism of the magnetic poles at the ends of the reference position part 5a can be made stronger than that of any other magnetic poles as shown by N+ and S+ in FIG. 11.

Although the fourth to seventh embodiments are described referring to an isotropic ferrite type magnet, a radial anisotropic ferrite type magnet and a rare-earth type magnet can also be applied thereto instead.

FIGS. 12 to 15 illustrate the eighth to eleventh embodiments, which are other versions of magnetization in accordance with the third embodiment of the present invention.

Eighth Embodiment

Figure 12:
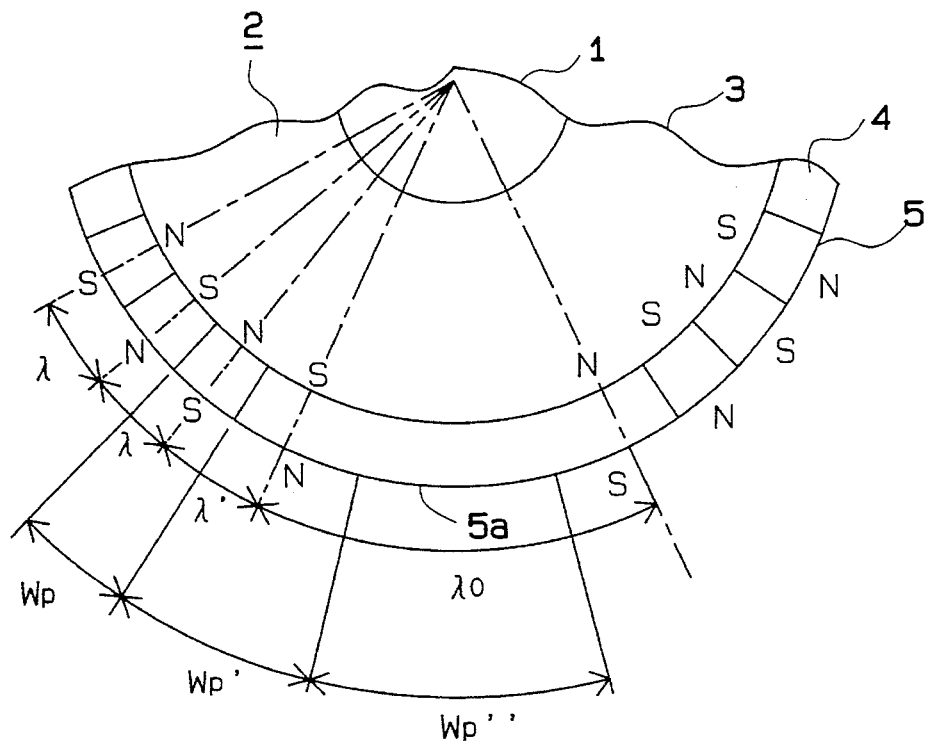
FIG. 12 is a partial plan view illustrating a magnet according to the eighth embodiment.

As illustrated in FIG. 12, an annular radial anisotropic ferrite type magnet 4 is adhered to the outer periphery of the magnet holding part 3. The magnet 4 includes the reference position part 5a left with the non-magnetized part with the width WP". The magnet 4 is alternately provided with magnetic poles of different directions with the magnetization width Wp. The magnetism of the magnetic poles provided in opposition to each other in the reference position part 5a is strengthened by being magnetized with the magnetization width Wp', where Wp' is larger than Wp.

Ninth Embodiment

Figure 13:
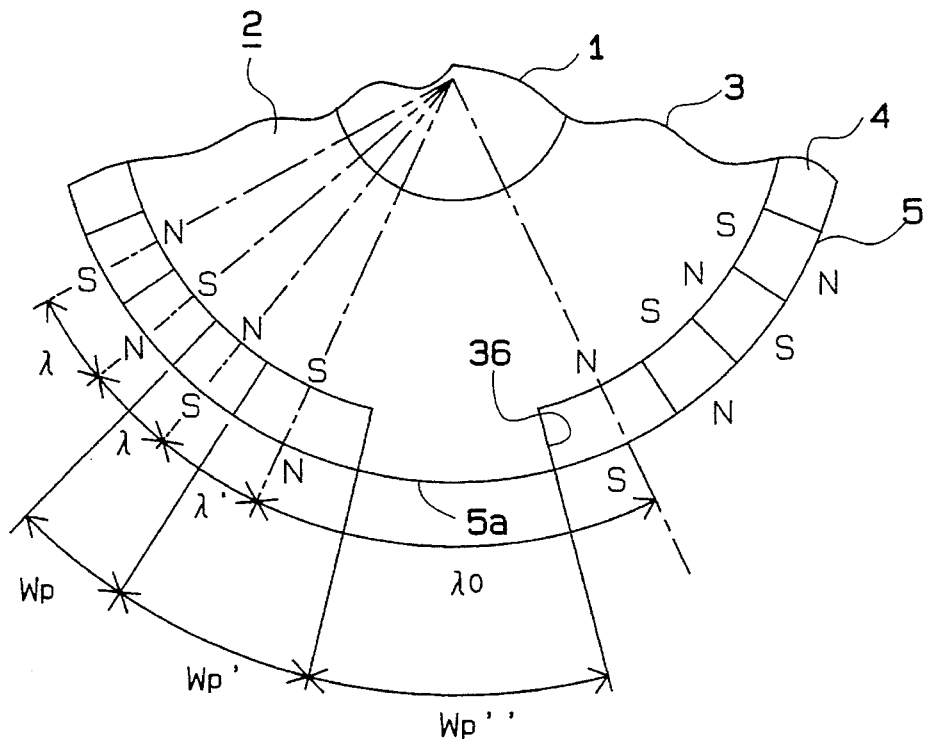
FIG. 13 is a partial plan view illustrating a magnet according to the ninth embodiment.

As illustrated in FIG. 13, a radially outwardly projected part 36 with the width Wp" is formed on part of the outer periphery of the magnet holding part 3, and an annular radian anisotropic magnet 4 is adhered to the other part of the outer periphery of the magnet holding part 3. The magnet 4 is alternately provided with magnetic poles of different directions with the magnetization width Wp. The projected part 36 of the magnet holding part 3 corresponds to the reference position part 5a, and magnetic poles are provided in opposition to each other in the reference position part 5a with the magnetization width Wp', where Wp' is larger than Wp.

Tenth Embodiment

Figure 14:
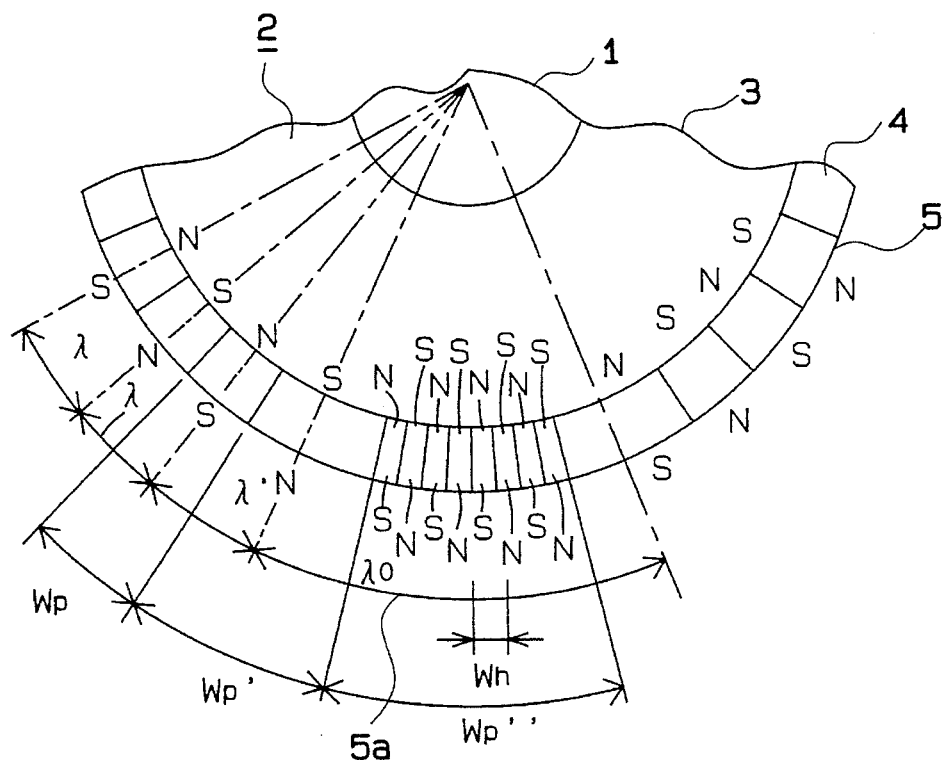
FIG. 14 is a partial plan view illustrating a magnet according to the tenth embodiment.

As illustrated in FIG. 14, an annular radial anisotropic magnet 4 is adhered to the outer periphery of the magnet holding part 3. The magnet 4 is alternately provided with magnetic poles of different directions and with the magnetization width Wp. The reference position part 5a is provided with magnetic poles in opposition to each other with the magnetization width Wp', where Wp' is larger than Wp. Furthermore, the reference position part 5a is alternately provided with a plurality of magnetic poles of different directions with the minute magnetization width Wh.

As the narrower the magnetization width is, the lower the magnetic field intensity Hy is, when the magnetization width is minute and the magnetization direction is alternating as arranged in the above, the magnetic field intensity Hy in the reference position part 5a can be made extremely low. As a result, the magnetic field intensity Hy in the reference position part 5a can be made as if it was a non-magnetized part.

Eleventh Embodiment

Figure 15:
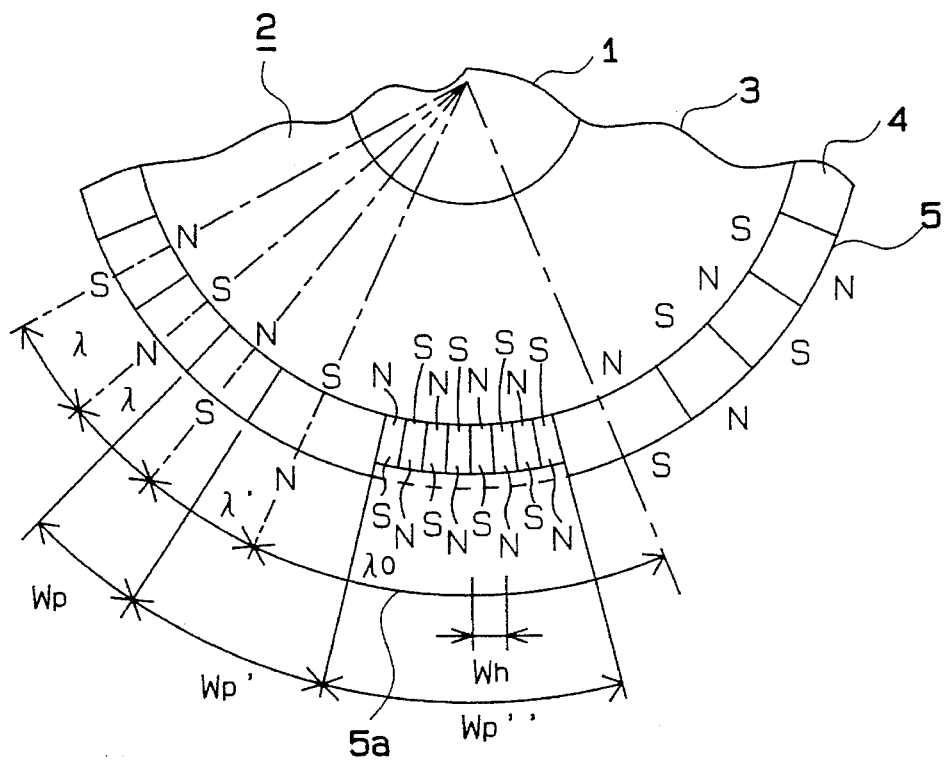
FIG. 15 is a partial plan view illustrating a magnet according to the eleventh embodiment.
Figure 16:
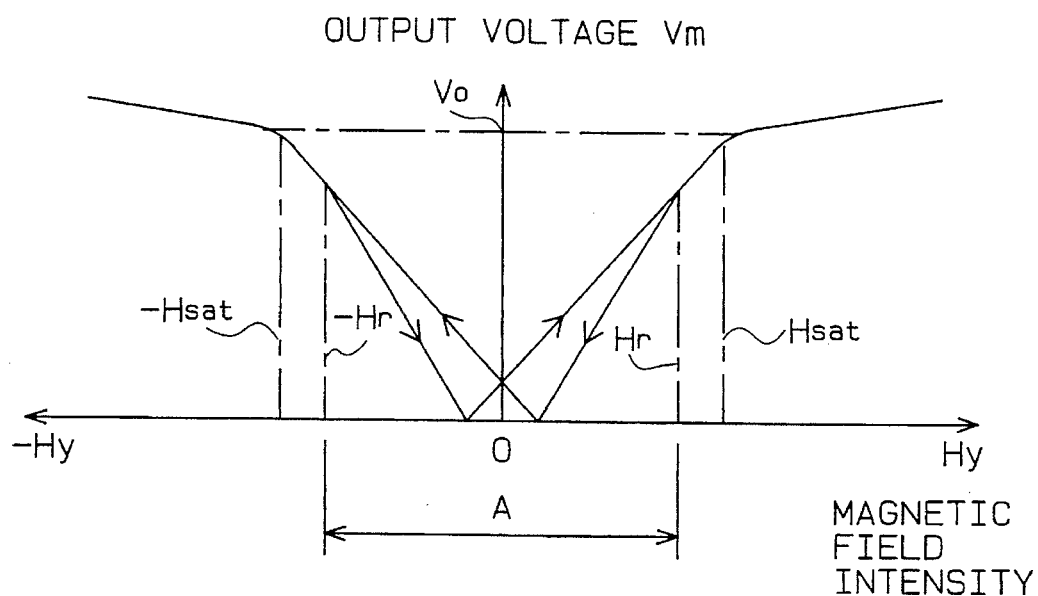
FIG. 16 is a characteristic diagram illustrating the relation between the magnetic field intensity Hy and output voltage Vm from the conventional MR elements.
Figure 17:
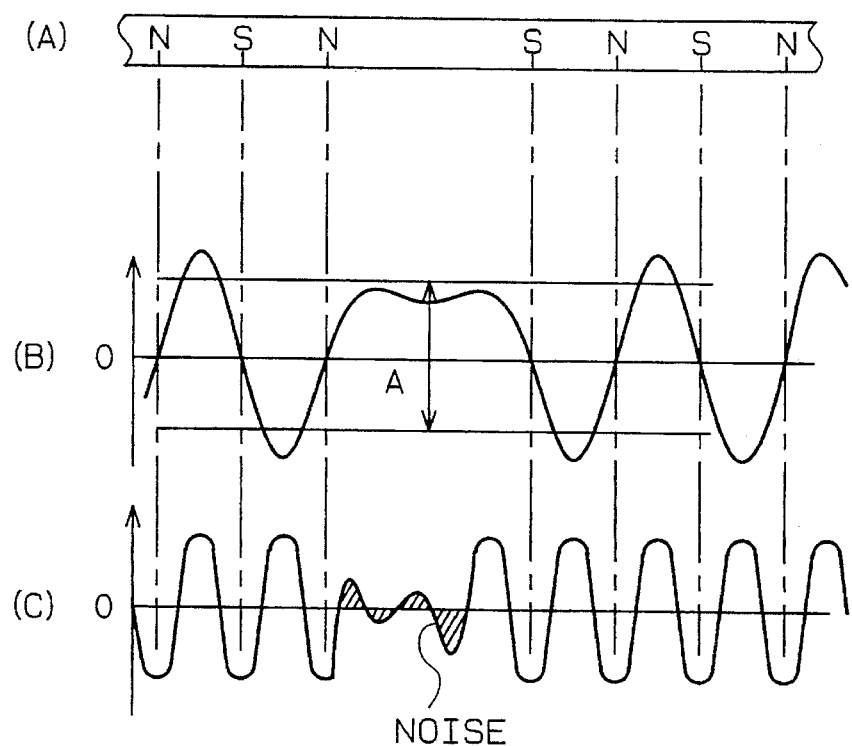
FIG. 17 is a waveform chart illustrating the magnetization pattern (A), magnetic field intensity (Hy) and sensor output (C) for use in explaining prior art.

As illustrated in FIG. 15, an annular radial anisotropic magnet 4 is adhered to the outer periphery of the magnet holding part 3. The magnet 4 is alternately provided with magnetic poles of different directions with the magnetization width Wp. The reference position part 5a is provided with magnetic poles in opposition to each other with the magnetization width Wp', where Wp' is larger than Wp. Furthermore, the reference position part 5a is alternately provided with a plurality of magnetic poles of different directions with the fine magnetization width Wh. Moreover, in this eleventh embodiment, the magnetic field intensity Hy in the reference position part 5a can be made lower than that of the aforementioned tenth embodiment of FIG. 14 by omitting the magnetized part with the minute width from the reference position part 5a in the radial direction.

The invention having been described above can improve the reference position detecting precision by stabilizing the output signal from the magnetoelectric transducers in the reference position part.

This present invention may be modified in various way. For instance, it may be applied for detecting a linearly moving position, without departing from the spirit of the invention.

What is claimed is:

1. A position detector comprising:

a movable body having poles with alternating opposite magnetization polarities at a first magnetization pitch on a surface thereof except at a reference position part which has a second magnetization reference position pitch larger than said first magnetization pitch; and a transducer, including at least two ferromagnetic thin film stripe elements disposed in a direction of movement of said movable body and connected together in a bridge circuit whose AC output is nearly zero when proximate to said reference position part, facing said movable body for generating an alternating current voltage signal corresponding to an intensity of a magnetic field from said magnetized surface, said transducer being saturated when said magnetic field intensity in said direction of movement of said movable body is above a predetermined level at which hysteresis of said thin film elements does not occur;

wherein an intensity of said magnetic field in said direction of movement of said movable body at said reference position part is above said predetermined level.

2. A position detector comprising:

a movable body having poles with alternating opposite magnetization polarities at a first magnetization pitch on a surface thereof except at a reference position part which has a second magnetization reference position pitch larger than said first magnetization pitch; and a magnetoresistive transducer facing said movable body for generating a voltage signal corresponding to an intensity of a magnetic field from said magnetized surface, said transducer being saturated when said magnetic field intensity is above a predetermined level;

wherein an intensity of said magnetic field at said reference position part is above said predetermined level, and said movable body comprises a rotor having a magnetized circumferential rim as said surface and wherein a magnetic field intensity of a portion of said circumferential surface immediately adjacent to said reference position part is higher than that of other ones of said magnetic poles.

3. A position detector according to claim 2, wherein said rotor has at least a pair of magnetic poles in a circumferential direction.

4. A position detector according to claim 3, wherein said portion immediately adjacent to said reference position part is radially enlarged in comparison with other portions of said circumferential portion.

5. A position detector according to claim 2, wherein said rotor has a pair of magnetic poles radially disposed thereon and a width of magnetic poles immediately adjacent to said reference position part is wider than that of other magnetic poles of said rotor.

6. A position detector according to claim 5, wherein said circumferential portion between said magnetic poles immediately adjacent to said reference position part is non-magnetized.

7. A position detector according to claim 5, wherein a degree of magnetization of said circumferential position between said magnetic poles immediately adjacent to said reference position part is less than that of other ones of said magnetic poles.

8. A position detector according to claim 2, wherein said rotor is magnetized primarily in a radial direction thereof.

9. A position detector according to claim 8, wherein said rotor has at least a pair of magnetic poles in a circumferential direction thereof.

10. A position detector according to claim 8, wherein said rotor has a pair of magnetic poles radially disposed thereon and a width of magnetic poles immediately adjacent to said reference position part is wider than that of other magnetic poles of said rotor.

11. A position detector according to claim 2, wherein said magnetoresistive transducer is for generating said voltage signal corresponding to said intensity of said magnetic field from said magnetized surface in a direction of movement of said magnetic surface.

12. A position detector according to claim 2, wherein:

said magnetoresistive transducer comprises two transducer elements disposed in a direction of movement of said magnetic surface, said two transducer elements being connected together in a bridge circuit; and an output of said bridge circuit is zero in the absence of a net magnetic field.

13. A position detector comprising:

a rotor having poles with alternating opposite magnetization polarities at a first magnetization pitch on a circumferential magnetized surface thereof except at a reference position part which has a second magnetization reference position pitch larger than said first magnetization pitch, a degree of magnetization of a portion of said circumferential surface immediately adjacent to said reference position part being higher than that of other ones of said magnetic poles;

two ferromagnetic reluctance transducer elements, disposed in a direction of movement of said magnetic surface and facing said rotor, for generating a voltage signal corresponding to an intensity of a magnetic field from said magnetized surface, said transducer elements being saturated when said magnetic field intensity is above a predetermined level at which hysteresis of the transducer elements does not occur, said two transducer elements being connected together in a bridge circuit whose output is zero in the absence of a net magnetic field, wherein an intensity of said magnetic field at said reference position part is above said predetermined level, and said rotor having a magnetized circumferential rim as said circumferential magnetized surface and wherein a magnetic field intensity of a portion of said circumferential surface immediately adjacent to said reference position part is higher than that of other ones of said magnetic poles.

14. A position detector according to claim 13, wherein said rotor has at least a pair of magnetic poles in a circumferential direction.

15. A position detector according to claim 14, wherein said portion immediately adjacent to said reference position part are made of a material which is different in composition from other portions of said circumferential surface.

16. A position detector according to claim 14, wherein said portion immediately adjacent to said reference position part is radially enlarged in comparison with other portions of said circumferential portion.

17. A position detector according to claim 13, wherein said rotor has a pair of magnetic poles radially disposed thereon and a width of magnetic poles immediately adjacent to said reference position part is wider than that of other magnetic poles of said rotor.

18. A position detector according to claim 17, wherein said circumferential portion between said magnetic poles immediately adjacent to said reference position part is non-magnetized.

19. A position detector according to claim 17, wherein a degree of magnetization of said circumferential position between said magnetic poles immediately adjacent to said reference position part is less than that of other ones of said magnetic poles.

20. A position detector according to claim 13, wherein said rotor is magnetized primarily in a radial direction thereof.

21. A position detector according to claim 20, wherein said rotor has at least a pair of magnetic poles in a circumferential direction thereof.

22. A position detector according to claim 20, wherein said rotor has a pair of magnetic poles radially disposed thereon and a width of magnetic poles immediately adjacent to said reference position part is wider than that of other magnetic poles of said rotor.

23. A position detector according to claim 13, wherein said magnetoresistive transducer is for generating said voltage signal corresponding to said intensity of said magnetic field from said magnetized surface in a direction of movement of said magnetic surface.

24. A position detector according to claim 13, wherein:

said magnetoresistive transducer comprises two transducer elements disposed in a direction of movement of said magnetic surface, said two transducer elements being connected together in a bridge circuit; and an output of said bridge circuit is zero in the absence of a net magnetic field.

25. A position detector according to claim 3, wherein said portion immediately adjacent to said reference position part are made of a material which is different in composition from other portions of said circumferential surface.

* * * * *